United States Patent
Feit et al.

[11] Patent Number: 5,639,528
[45] Date of Patent: Jun. 17, 1997

[54] HOSE CONSTRUCTION CONTAINING FLUOROPLASTIC TERPOLYMERS

[75] Inventors: Allan Duane Feit; Gregory Alan Chapman, both of Lincoln, Nebr.

[73] Assignee: The Goodyear Tire & Rubber Company, Akron, Ohio

[21] Appl. No.: 427,430

[22] Filed: Apr. 24, 1995

[51] Int. Cl.[6] ........................................... F16L 11/04
[52] U.S. Cl. .............. 428/36.91; 428/36.2; 428/517; 428/520; 428/521; 138/118.1; 138/125; 138/126; 138/127; 138/137; 138/DIG. 3
[58] Field of Search ................... 428/36.2, 36.6, 428/36.7, 36.8, 36.91, 36.4, 421-2, 213, 475.8, 480, 518, 517, 520, 521; 138/118.1, 125-7, 137, DIG. 3; 524/92

[56] References Cited

U.S. PATENT DOCUMENTS

| | | | |
|---|---|---|---|
| Re. 32,230 | 8/1986 | Satoh et al. | 138/DIG. 3 |
| 4,316,941 | 2/1982 | Eguchi et al. | 428/422 |
| 4,486,480 | 12/1984 | Okumoto et al. | 428/36.8 |
| 4,490,501 | 12/1984 | Vasta | 428/422 |
| 4,606,952 | 8/1986 | Sugimoto et al. | 428/36.8 |
| 4,614,779 | 9/1986 | Watanabe et al. | 525/199 |
| 4,828,923 | 5/1989 | Nakagawa et al. | 428/422 |
| 4,905,735 | 3/1990 | Akiyoshi | 428/36.2 |
| 5,026,583 | 6/1991 | Nakagawa et al. | 428/36.91 |
| 5,319,025 | 6/1994 | Weigelt | 525/151 |
| 5,354,618 | 10/1994 | Ishigaki et al. | 428/424.8 |
| 5,427,831 | 6/1995 | Stevens | 428/36.2 |

FOREIGN PATENT DOCUMENTS

| 15721 | 4/1981 | Japan. |
|---|---|---|
| 60104 | 12/1986 | Japan. |

*Primary Examiner*—Charles Nold
*Assistant Examiner*—Christos Kyriakou
*Attorney, Agent, or Firm*—Bruce J. Hendricks

[57] ABSTRACT

The present invention relates to a hose construction containing a fluoroplastic barrier. The hose comprises (1) an inner core comprising (a) acrylonitrile-butadiene rubber and (b) from 0.05 to 25 phr of unsubstituted or substituted phenol salts of 1,8-diazabicyclo-[5,4,0]undecene-7; (2) a barrier layer comprised of a terpolymer derived from tetrafluoroethylene, hexafluoropropylene and vinylidene fluoride, wherein said barrier layer is directly adhered to said inner core; and (3) an elastomeric cover.

9 Claims, 1 Drawing Sheet

HOSE CONSTRUCTION CONTAINING FLUOROPLASTIC TERPOLYMERS

BACKGROUND OF THE INVENTION

A major proportion of fuel hose presently employed in automobile applications is a multi-layered structure. The innermost tubular layer of the hose is formed of an elastomeric material intended to keep the fluid in the hose. Located between the inner core and the outer elastomeric cover is a barrier layer. Many barrier layers have been used; however, many such compounds used in the barrier do not adhere to the conventional elastomeric material used in the innermost tubular layer. As a result of this problem, those skilled in the art conventionally use a layer between the inner core and the barrier layer which is both compatible to the elastomer used in the inner core and the barrier layer. Use of these "compatible" layers further adds to the cost and the resulting diameters of these fuel hose applications.

SUMMARY OF THE INVENTION

There is disclosed a hose comprising (1) an inner core comprising (a) acrylonitrile butadiene rubber and (b) from 0.05 to 25 phr of unsubstituted or substituted phenol salts of 1,8-diazabicyclo-[5,4,0] undecene-7;

(2) a barrier layer comprised of a terpolymer derived from tetrafluoroethylene, hexafluoropropylene and vinylidene fluoride, wherein said barrier layer is directly adhered to said inner core; and (3) an elastomeric cover.

DETAILED DESCRIPTION OF THE INVENTION

Figure 1:
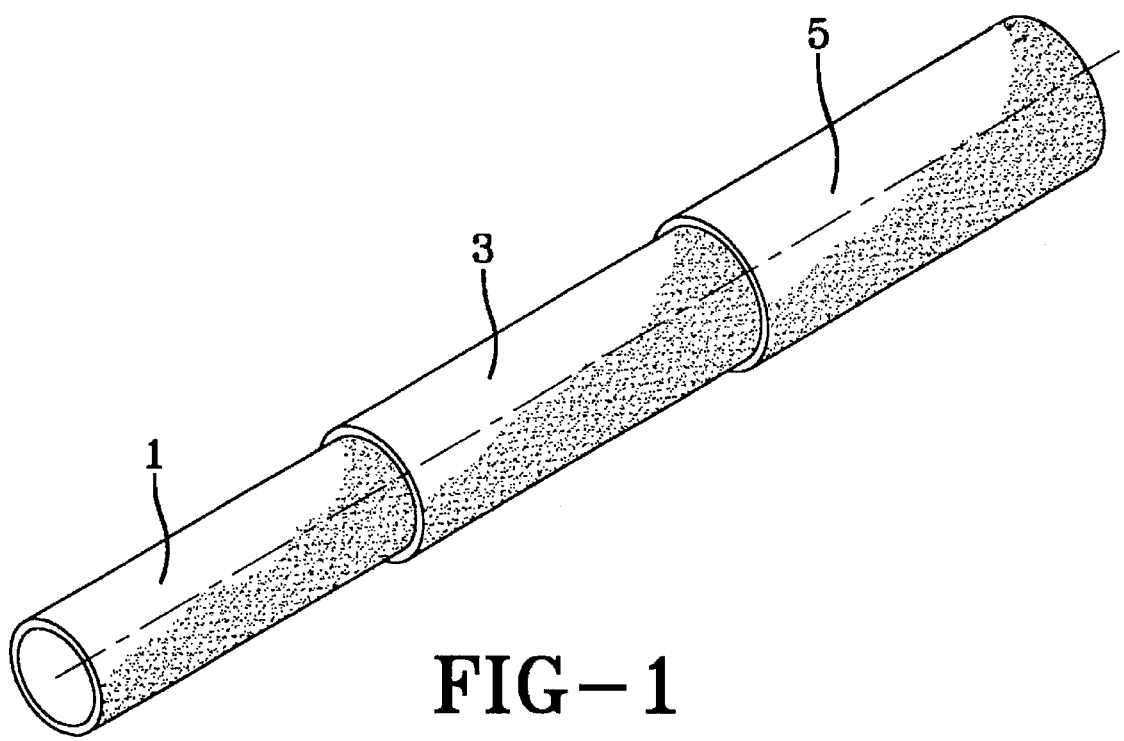
FIG. 1 is a perspective view of a hose according to the invention.

When a hose, for example, as shown in FIG. 1 is produced, the inner core (1) or tubular core of the present invention is formed from acrylonitrile butadiene (NBR) rubber.

Various acrylonitrile butadiene rubbers may be used. For example, the Mooney viscosity (M/L 1+4 @100° C.) and the acrylonitrile content may vary depending on the use of the hose. Suitable examples of acrylonitrile butadiene rubber may have a Mooney viscosity as low as 20 to as high as 91. The acrylonitrile content may range from as low as 15.9 percent to as high as 46.2 percent. Representative acrylonitrile rubbers that are commercially available from The Goodyear Tire & Rubber Company include a family of products marketed under the Chemigum™ line, such as Chemigum™ N206 (Mooney 55–70 and ACN of 46.2 percent), Chemigum™ N300 (Mooney 50–63 and ACN of 40 percent), Chemigum™ N318 (Mooney 68–82 and ACN of 40 percent), Chemigum™ N328 (Mooney 65–80 and ACN of 41.5 percent), Chemigum™ N386B (Mooney 55–65 and ACN of 40.5 percent), Chemigum™ N608 (Mooney 63–75 and ACN of 33.4 percent), Chemigum™ N612B (Mooney 20–30 and ACN of 33.4 percent), Chemigum™ N615B (Mooney 47–60 and ACN of 33.4 percent), Chemigum™ N624B (Mooney 38–50 and ACN of 32.9 percent), Chemigum™ N628B (Mooney of 68–85 and ACN of 33.4 percent), Chemigum™ N683B (Mooney 25–35 and ACN of 33.4 percent), Chemigum™ N685B (Mooney 45–55 and ACN of 33.4 percent), Chemigum™ N687B (Mooney 65–75 and ACN of 33.4 percent), Chemigum™ N689B (Mooney 79–91 and ACN of 33.4 percent), Chemigum™ N715 (Mooney 45–63 and ACN of 29.3 percent), Chemigum™ N785B (Mooney 45–55 and ACN of 27.7 percent), Chemigum™ N917B (Mooney 55–70 and ACN of 22.8 percent), Chemigum™ N926 (Mooney 55–70 and ACN of 15.9 percent) and Chemigum™ N984B (Mooney 35–45 and ACN of 20.0 percent).

This inner core (1) of NBR may be formed by extrusion methods known to those skilled in the art. The thickness of this inner core (1) is important as excessively thin wall thicknesses or excessively thick wall thicknesses present flexibility or kinking problems or coupling compatibility problems of the final hose composite. It is believed that the inside diameter of the inner core (1) should range from 4 mm to 75 mm. Preferably, the inside diameter of the inner core will range from 6 mm to 50 mm. The wall thicknesses of the inner core (1) should range from 0.5 mm to 4.0 mm, with a range of from 1.2 mm to 2.8 mm being preferred.

Uniformly dispersed within the acrylonitrile-butadiene rubber is from about 0.05 to 25 phr of an unsubstituted or substituted phenol salts of 1,8-diazabicyclo-[5,4,0] undecene-7. Examples of such compounds include the phenol salt of 1,8-diazabicyclo-[5,4,0]undecene-7, the cresol salts of 1,8-diazabicyclo-[5,4,0]undecene-7, resorcinol salts of 1,8-diazabicyclo-[5,4,0]undecene-7 and hydroquinone salts of 1,8-diazabicyclo-[5,4,0]undecene-7. The phenol salt of 1,8-diazabicyclo-[5,4,0]undecene-7 is preferred. Preferably, the amount of the unsubstituted or substituted phenol salt arrange from 2.0 to 6.0 phr. A particularly preferred unsubstituted phenol salt of 1,8-diazabicyclo-[5, 4,0]undecene-7 is commercially available from Mitsui & Co (Canada) Ltd under the commercial designation of Accelerator P152.

In addition to the above, the NBR inner core (1) composition may contain conventional additives including reinforcing agents, fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 200 parts by weight based on 100 parts by weight of total rubber (phr). Preferably, carbon black is used in amounts ranging from about 35 to 120 phr. Typical carbon blacks that are used include N110, N330, N332, N472, N550, N630, N642, N650, N762, N770, N907, N908, N990, and N991. In those instances, when the hose will be used to convey flammable fluids, electrically conductive blacks may be used. Noncarbon black fillers which may be used include talc, clay, calcium carbonate, silica and the like. Noncarbon black fillers may be used in an amount ranging from about 5 to 150 phr. Oil dispersions containing such fillers may also be used. Organosilanes such as 3,3' bis(triethoxysilylpropyl) tetrasulfide may be used in amounts ranging from 0.1 to 20 phr. Suitable examples of such organosilanes are disclosed in U.S. Pat. No. 4,128,438 incorporated herein by reference in its entirety. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent, if used, will vary depending on the type of rubber and particular type of sulfur vulcanizing agent but generally range from about 0.1 phr to about 10 phr with a range of from about 0.5 phr to about 3 phr being preferred. Representative of the antidegradants which may be in the rubber composition include microcrystalline wax, paraffinic wax, monophenols, bisphenols, thiobisphenols, polyphenols, hydroquinone derivatives, phosphites, phosphate blends, thioesters, naphthylamines, diphenol amines, substituted and unsubstituted diaryl amine derivatives, diarylphenylenediames, paraphenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include activated dithio-bisbenzanilide, poly-paradinitrosobenzene, xylyl mercaptans, aliphatic-naphthenic aromatic resins, polyethylene glycol, petroleum oils, ester plasticizers, vulcanized vegetable oils, pine tar, phenolic resins, synthetic oils, petroleum resins, polymeric esters and rosins. These processing oils may be used in a conventional amount ranging from about 0 to about 140 phr. Representative of an initiators that may be used is stearic acid. Initiators are generally used in a conventional amount ranging from about 1 to 4 phr. Additional additives which may be used as part of the cure package include calcium oxide, zinc oxide and magnesium oxide. These additives are conventionally used in amounts ranging from 0.1 to 25 phr.

Accelerators may be used in a conventional amounts, such as from about 0.1 phr to 10 phr. In cases where only a primary accelerator is used, the amounts range from about 0.1 to 10 phr. In cases where combinations of two or more accelerators are used, the primary accelerator is generally used in amounts ranging from 0.1 to 10.0 phr and a secondary accelerator is used in amounts ranging from about 0.1 to 10.0 phr. Combinations of accelerators have been known to produce a synergistic effect. Suitable types of conventional accelerators are amines, disulfides, guanidines, thioureas, thiazoles, thiurams, thiols, sulfenamides, dithiocarbamates and xanthates.

One advantage of the present invention is that the inner core (1) may be directly adhered to the barrier layer (3) used in the present invention. Accordingly, no "compatible" polymeric layer need be present between the inner core (1) and the barrier layer (3) of the present invention.

The barrier layer (3) used in the present invention is derived from a terpolymer derived from tetrafluoroethylene, hexafluoropropylene and vinylidene fluoride. The thickness of this barrier layer (3) is important, as excessively thin wall thicknesses or excessively thick wall thicknesses present flexibility or kinking problems or desired barrier properties. Generally speaking, the thickness of the barrier layer (3) will range from about 0.02 mm to about 0.76 mm with a range of from about 0.12 mm to 0.25 mm being preferred. As mentioned above, one of the advantages of the present invention is that this terpolymer can be directly extruded over the inner core (1) composed of the acrylonitrile butadiene rubber. The preferred terpolymers which may be used to form the barrier layer (3) of the hose of the present invention are commercially available from the 3M Company under the commercial designations THV 200, THV 300, THV 400 and THV 500. THV 500 has a melting range of from 165° to 180° C., a melt flow index of 5–15 (265° C./5 kilogram) as determined by ASTM 1238, a specific gravity of 1.98 grams per centimeter according to ASTM 792, a tensile of 20N/square meters according to ASTM 638 and an elongation of 450 percent according to ASTM 638.

The last element required in the hose of the present invention is an elastomeric cover (5). This cover (5) may be extruded over the underlying layer, which may be the barrier layer (3) or, as discussed below, various other optional layers. The elastomers which may be used to form the cover for the hose of the present invention include those known to those skilled in the art such as chlorosulfonated polyethylene, chlorinated polyethylene, acrylonitrile-butadiene rubber/PVC blends, epichlorohydrin, EPDM, chloroprene, EVA and EVM. Preferably, the elastomer used in the cover is chlorinated polyethylene or a NBR/PVC blend. The thickness of the elastomeric cover (5) is obviously depends upon the desired properties of the hose and the elastomer that is used. Generally speaking, the thickness of the elastomeric cover (5) will range from about 0.5 mm to about 2.5 mm, with a range of from 1.0 mm to being 1.5 mm being preferred.

Figure 2:
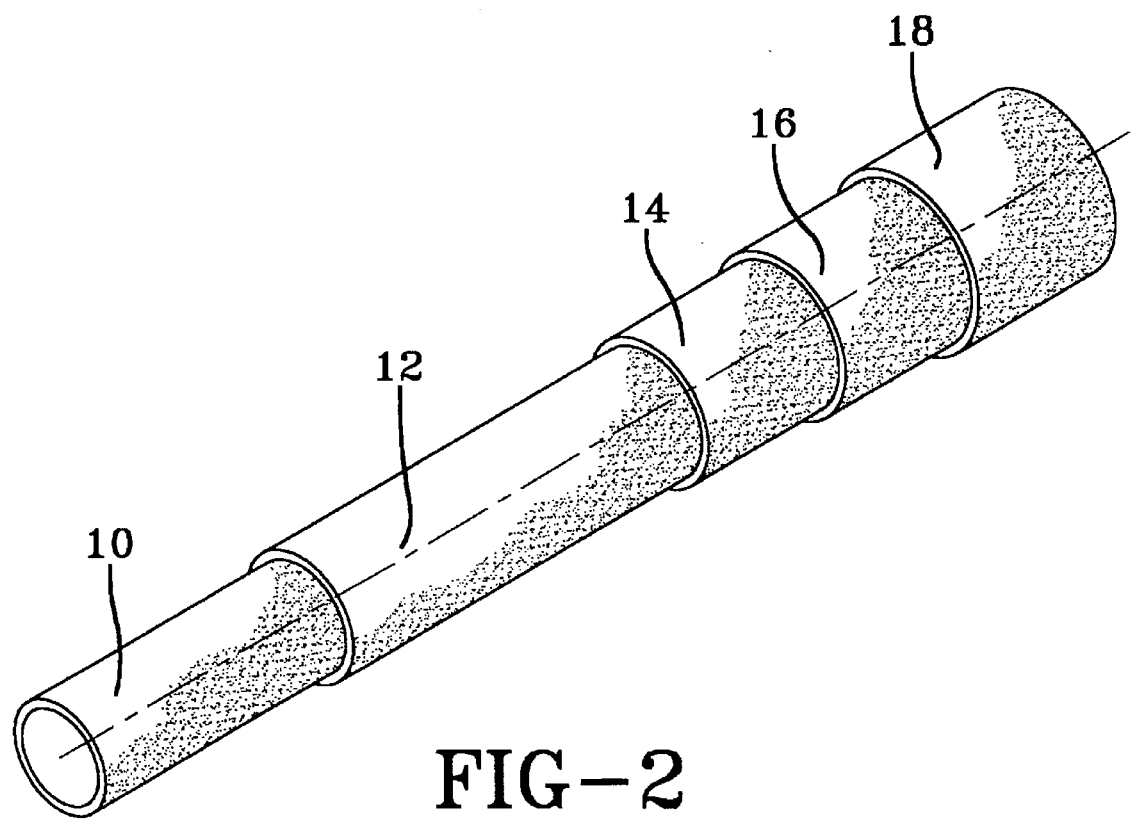
FIG. 2 is a perspective view of a hose according to the invention.

Whereas the three basic layers have been discussed above as essential to the present invention, the hose of the present invention may have optional features. For example, when a hose, as shown in FIG. 2, is produced having the inner core (10) and barrier layer (12), dispersed on the outside of the barrier layer (12) may be a first layer (14) of another polymer. Such polymer may be of the same composition as the inner core. In another embodiment, the polymer which is used in this first layer (14), which interfaces the barrier layer (12), may be epichlorohydrin. The thickness of this first layer (14) which interfaces the barrier layer (12) may range depending upon the polymer selected. Generally speaking, the thickness of this layer will range of from about 0.25 mm to about 1.5 mm with a range of from about 0.50 mm to about 1.0 mm being preferred.

Another optional feature of the present invention is reinforcement (16) may be added on top of the first layer (14) which interfaces with the barrier layer (12). Such reinforcement (16) is known to those skilled in the art and may consist of spiraled, knitted or braided yarn. Such reinforcements are typically derived from polyester, nylon, rayon or aramid cords. The reinforcement (16) is preferably spirally wound about the first layer under sufficient tension to improve the strength of the hose structure. The reinforcement layer (16) is preferably spirally wrapped at angles such that the flexing of the hose will not result in collapse or kinking. An angle such as from 0° to 89.9° with respect to the centerline of the hose may be used. Most preferably, a neutral angle of 54° 73' or below is used for the spiral wraps.

As mentioned above, the elastomeric cover (18) is the outside layer.

The following examples are provided to illustrate the instant invention and are not intended to limit the same. All parts are parts by weight, unless listed otherwise.

EXAMPLE 1

In accordance with the teachings of the present invention, a hose construction was prepared. The hose construction comprised an inner core of an NBR compound. The NBR compound contained 100 phr of Chemigum™ N608, 2 phr of P152 and conventional amounts of antidegradants, MgO, carbon blacks, processing oils, organosilane, CaO and accelerators.

The NBR inner core tube was extruded using a Berstorff 4.5 inch (11.43 cm) diameter 16:1 L/D rubber extruder and straight head with temperature profile as shown in Table 1. The tube was extruded to 1.48 inch (3.76 cm) ID by 0.098 inch (2.49 mm) wall using a 1.290 inch (3.28 cm) OD inner die and a 1.430 inch (3.63 cm) ID outer die. The screw was running 34 to 37 RPM to produce a line speed of 60 feet per inch (4.76 cm) OD tapered inner die and a 1.813 inch (4.60 cm) ID tapered outer die were used to produce the extrudate. The cover was applied at 34 feet per minute (10.36 meters per minute). Water was sprayed on the hose to aid cooling. Excess water was removed with a forced air device. A lubricant was applied to inhibit hose sticking together. Then the hose was cut to length.

Cut length of hose was loaded onto a 1.56 inch (3.96 cm) OD forming mandrels and then cured to shape at a conventional temperature (160°–185° C.).

After cure, the formed hoses were removed from the mandrels, washed and then cut to finished length.

TABLE 1

| | | EXTRUDER TEMPERATURE PROFILES °C. BARREL ZONES | | | | | | | |
|---|---|---|---|---|---|---|---|---|---|
| Extruder | Matl | screw | feed | transition | metering 1 | metering 2 | neck | head | die |
| Tube | NBR | 71 | 66 | 77 | 93 | 93 | N/A | 110 | N/A |
| Barrier | THV | N/A | 235 | 246 | 252 | 254 | 257 | 257 | 257 |
| Friction | NBR | 66 | N/A | 82 | 82 | 82 | N/A | 110 | N/A |
| Cover | CSM | 66 | 71 | 77 | 82 | 82 | N/A | 104 | N/A | minute (18.29 meters per minute). The extrudate was cooled with water spray and the excess water removed by a forced air blow-off device. The NBR extrudate was then wrapped on a pan and moved to the next step.

The NBR extrudate was pulled off the pan through a Davis-Standard cross-head mounted on a Sterling 3 inch (7.62 cm) diameter plastic extruder with a 24:1 L/D. The THV 500 barrier was extruded using the temperature profile shown in Table 1 through a 2.69 inch (6.83 cm) OD inner die and a 2.77 inch (7.04 cm) ID outer die and drawn onto the tube. The plastic extruder was run at 3.6 to 4.0 RPM with a line speed of 26 to 28 feet per minute (7.92 to 8.53 meters per minute). The THV 500 barrier was drawn down to 0.010 inch thick and air cooled on the tube.

Next, the tube and barrier were pulled through an NRM cross-head mounted on a 3.5 inch (8.89 cm) diameter NRM rubber extruder with a 12:1 L/D with temperature profile shown in Table 1. A 0.035 inch (0.89 mm) gage NBR friction layer (same composition as used in inner cord) was applied over the THV 500 layer with the aid of vacuum. A 1.906 inch (4.3 cm) OD tapered inner die and a 1.875 inch (4.76 cm) ID tapered outer die were used to produce the extrudate. The extruder was run with a speed setting of 2.5 and a line speed of 27 to 28 feet per minute (8.23 to 8.53 meters per minute). Water spray was used to cool the extrudate. Excess water was removed by a forced air blow-off device. After the water was removed, the extruded layers were wrapped onto a pan and transported to the next step.

The extrusion layers were pulled from the pan and through a knitter. Aramid reinforcement yarn (1500 denier) was applied by knitting at 9 knits per inch (~3.5 knits per cm) plane stitch using a 20 needle knitter. The 1.860 inch (4.72 cm) OD knitted stock was wrapped on a pan and taken to cover.

A 0.040 inch (4.8 mm) chlorosulfonated polyethylene cover was applied by pulling the knitted extrudate layers from the pan and through a NRM rubber cross-head attached to a 4.5 inch (11.43 cm) NRM rubber extruder. The temperature profile for the extruder is shown in Table 1. A 1.875

EXAMPLE 2

In order to demonstrate the advantage of the present invention, two NBR samples were prepared. One sample contained 2.0 phr of P152. The other sample did not contain any P152. Other than the P152, the recipe for each sample was identical. The adhesion of each NBR sample to a THV 500 layer was measured according to the Drum Adhesion Method ASTM D1871-89 Method 2. Table 2 below lists the results.

TABLE 2

| Sample | A | B |
|---|---|---|
| Level of P152 (phr) | 2 | 0 |
| Adhesion, ppiw*, Original (N/mm) | 18 | 0 |
| | (3.15) | (0) |

*ppiw = pounds per inch width
N/mm = Newtons per millimeter width

EXAMPLE 3

A series of samples of NBR compounds containing P152 were tested for adhesion to THV 500. The test method that was used was the Drum Adhesion Method ASTM D1871-89 Method 2. All NBR compounds were identical in composition except for the level of P152. Table 3 below lists the results of the test.

TABLE 3

| Sample | A | B | C | D |
|---|---|---|---|---|
| Level of P152 (phr) | 1 | 2 | 4 | 10 |
| Adhesion, ppiw*, Original (N/mm) | 15 (2.63) | 15 (2.63) | 19 (3.33) | 11 (1.93) |
| Adhesion, ppiw*, After Aging[1] (N/mm) | 14 (2.45) | 18 (3.15) | 9 (1.58) | 19 (3.33) |

[1] After immersion in gasohol (25 percent methanol and 75 percent ASTM Fuel C) 48 hours @ 23° C.
*ppiw = pounds per inch width
N/mm = Newtons per millimeter width

What is claimed is:

1. A hose comprising (a) an inner core having an inside diameter ranging from 4 to 75 mm and having a thickness ranging from 0.5 to 4.0 mm comprising (1) acrylonitrile-butadiene rubber having an acrylonitrile content ranging from 15.9 percent to 46.2 percent and (2) from 0.05 to 25 phr of uniformly dispersed unsubstituted phenol salts of 1,8-diazabicyclo-[5,4,0]undecene-7 and substituted phenol salts of 1,8-diazabicyclo-[5,4,0]undecene-7 selected from the group consisting of cresol salts of 1,8-diazabicyclo-[5,4,0]undecene-7, resorcinol salts of 1,8-diazabicyclo-[5,4,0]undecene-7 and hydroquinone salts of 1,8-diazabicyclo-[5,4,0]undecene-7;

(b) a barrier layer having a thickness ranging from 0.02 to 0.76 mm comprised of a terpolymer derived from tetrafluoroethylene, hexafluoropropylene and vinylidene fluoride, wherein said barrier layer is directly adhered to said inner core; and (c) an elastomeric cover.

2. The hose of claim 1 wherein a first layer is disposed between said barrier layer and elastomeric cover, said first layer comprising a polymer selected from the group consisting of (a) an acrylonitrile-butadiene rubber containing from about 0.05 to 2.5 phr of an unsubstituted or substituted phenol salt of 1,8-diazabicyclo-[5,4,0]undecene-7 and (b) epichlorohydrin.

3. The hose of claim 2 wherein a layer of tensioned reinforcement strands is disposed between said first layer and said elastomeric cover.

4. The hose of claim 1 wherein said elastomeric cover is selected from the group of elastomers consisting of chlorosulfonated polyethylene, chlorinated polyethylene, acrylonitrile-butadiene rubber/PVC blends, epichlorohydrin, EPDM, chloroprene, EVA and EVM.

5. The hose of claim 3 wherein said reinforcement is from textile yarns of polyester, nylon, rayon and aramid.

6. The hose of claim 1 wherein the thickness of the wall of the inner core ranges of from 1.2 to 2.8 mm.

7. The hose of claim 1 wherein the thickness of the elastomeric cover ranges from about 0.5 to 2.5 mm.

8. The hose of claim 1 wherein said acrylonitrile-butadiene rubber in the inner core contains 2.0 to 6.0 phr of an unsubstituted or substituted phenol salt of 1,8-diazabicyclo-[5,4,0]undecene-7.

9. The hose of claim 2 wherein said acrylonitrile rubber in said first layer contains 2.0 to 6.0 phr of an unsubstituted or substituted phenol salt of 1,8-diazabicyclo-[5,4,0]undecene-7.

* * * * *